United States Patent
Foitl et al.

[15] 3,687,939
[45] Aug. 29, 1972

[54] PROCESS FOR THE PRODUCTION OF 1-FORMYL-3-NITRO-AZACYCLO-ALKAN-2-ONES

[72] Inventors: Verena R. Foitl, Basel; Walter Traber, Riehen, both of Switzerland

[73] Assignee: Ciba-Geigy Corporation, Ardsley, N.Y.

[22] Filed: June 24, 1970

[21] Appl. No.: 49,554

[52] U.S. Cl. ..........................................260/239.3 R
[51] Int. Cl. ................................................C07d 41/06
[58] Field of Search ..............................260/239.3 R

[56] References Cited

UNITED STATES PATENTS

| | | |
|---|---|---|
| 2,832,771 | 4/1958 | Francis et al.........260/239.3 R |
| 2,836,592 | 5/1958 | Anagnostopoulos et al......................260/239.3 R |
| 3,000,881 | 9/1961 | Ottenheym et al..260/239.3 R |
| 3,031,443 | 4/1961 | Ottenheym et al..260/239.3 R |
| 3,080,358 | 3/1963 | Ottenheym et al..260/293.3 R |
| 3,093,634 | 6/1963 | Ottenheym et al..260/239.3 R |
| 3,093,635 | 6/1963 | Hoek et al...........260/239.3 R |
| 3,096,326 | 7/1963 | De Haan et al. ....260/239.3 R |
| 3,557,093 | 1/1971 | Foitl et al............260/2393. R |

*Primary Examiner*—Henry R. Jiles
*Assistant Examiner*—Robert T. Bond
*Attorney*—Karl F. Jorda and Frederick H. Rabin

[57] ABSTRACT

A new process for the production of 1-formyl-3-nitro-azacyclo-alkan-2-one compounds of the Formula 1

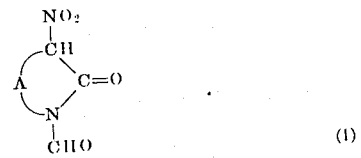

wherein
A represents an alkylene radical having four to 10 carbon atoms in its chain and being unsubstituted or substituted by at least one lower alkyl radcial, characterized by reacting a cycloalkanone oxime of the Formula II

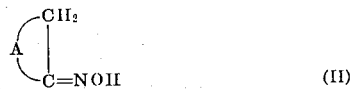

with the formamide of a secondary amine and a halogenating agent, nitrating the intermediate product obtained and then hydrolyzing it, is described.

The 1-formyl-3-nitro-azacycloalkan-2-ones are important intermediates in the production of amino acids, in particular of lysin and of agricultural chemicals.

3 Claims, No Drawings

PROCESS FOR THE PRODUCTION OF 1-FORMYL-3-NITRO-AZACYCLO-ALKAN-2-ONES

DETAILED DISCLOSURE

The invention concerns a new process for the production of 1-formyl-3-nitro-azacycloalkan-2-ones.

In German Pat. No. 1,157,232, a process for the production of 3-nitro-azacycloalkan-2-one carboxylic acid chlorides is described. From the literature, the production of 1-azacycloheptan-2-one ($\epsilon$-caprolactam) by the Beckmann rearrangement of cyclohexanone oxime with sulfuric acid is known. Furthermore, the reaction of activated aromatic compounds with a formylating agent based on an N-disubstituted formamide compound and an acid halogenating agent for the production of aldehydes is also known (Vilsmeier-Haak reaction).

According to the process of the present invention, 1-formyl-3-nitro-azacycloalkan-2-ones of the Formula I

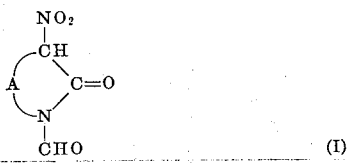

wherein

A represents an alkylene radical having four to 10 carbon atoms in its chain and being unsubstituted or substituted by at least one lower alkyl radical, are produced by reacting a cycloalkanone oxime of the Formula II

wherein A has the meaning given for Formula I, with the formamide of a secondary amine and a halogenating agent, preferably in the presence of an organic aprotic solvent and/or diluent, nitrating the intermediate product obtained and then hydrolyzing it.

The complex compound obtained as intermediate after the reaction of the oxime of Formula II with the formamide, is preferably nitrated at temperatures between −10° and +30° C. and then hydrolyzed at temperatures below +30° C. For the process according to the invention, the starting materials cycloalkanone oxime, formamide and halogenating agent are preferably employed in a molar ratio of 1:2:2. The formamide can, however, also be employed in a multiple of double the molar amount (calculated on the cycloalkanone oxime), the excess serving then as solvent and/or diluent. In general, an aprotic solvent or diluent is necessary in the reaction forming the complex compound. Besides the formamide of a secondary amine, aliphatic halogenated hydrocarbons such as dichloromethane, chloroform, chloronated ethanes, aliphatic and aromatic hydrocarbons and also aromatic halogenated hydrocarbons and ether-type compounds may be employed as aprotic solvents. By aprotic solvents are meant solvents which do not give off protons under the given reaction conditions.

As starting materials of the Formula II, the oximes of the following cycloaliphatic ketones are suitable: cyclohexanone, cycloheptanone, cyclononanone, cyclodecanone, cycloundecanone, cyclododecanone; these ketones may be mono- or poly-substituted by lower alkyl having one to six carbon atoms, for example by methyl, ethyl, n-propyl, isopropyl, n-butyl, sec-butyl, tert-butyl, as well as by pentyl and hexyl radicals.

The formamides of secondary amines employed correspond to the formula II

In this formula:

$R_1$ represents an alkyl radical having one to five carbon atoms, $R_2$ represents an alkyl radical having one to five carbon atoms, a cycloalkyl radical, the phenyl or benzyl radical, $R_1$ and $R_2$ together with the adjacent nitrogen atom represent a heterocyclic ring which can contain further hetero atoms.

Preferably the following formamides are employed in the process according to the invention: N,N-dimethylformamide, N,N-diethylformamide, N-methyl-N-phenylformamide, N-formylmorpholine, and N-formylpiperidine. Of these formamides, N,N-dimethylformamide has proved to be most suited.

As halogenating agents, halides of inorganic oxyacids are best suited, for example the following: phosphorus oxychloride, phosphorus trichloride, phosphorus pentachloride, phosphorus tribromide, thionyl chloride, sulfuryl chloride, phosgene, etc. These halogenating agents should be employed in the reaction in double the molar amount, calculated on the amount of oxime used. In some cases a multiple of this amount can be employed, the excess then serving as solvent or diluent.

For the nitration of the intermediate, preferably mixed acid (nitrating acid), i.e. a mixture of concentrated or fuming nitric acid and concentrated sulfuric acid, is used. In order to attain as quantitative a nitration as possible, it is advantageous to use the nitrating acid in excess; preferably the double to fivefold molar amount of $HNO_3$ is used, calculated on the amount of cycloalkanone oxime used. When a nitrating acid consisting of concentrated nitric acid, concentrated sulfuric acid and sulfur trioxide is used, the molar ratio of nitric acid to cycloalkanone oxime can be 1:1.

When performing the process according to the invention it has proved expedient to start with the formamide, adding the halogenating agent at temperatures between 0° and 40° C., preferably between 0° and 10° C., while stirring thoroughly. Then the cycloalkanone oxime is added. Both of the last-mentioned reaction components, the halogenating agent and the cycloalkanone oxime, can be employed in the reaction dissolved in one of the aprotic solvents mentioned above, such as benzene, chloroform, etc. To increase the velocity of the reaction, which of itself proceeds smoothly at temperatures in the range of 0° to 40° C., the reaction mixture can be heated to temperatures of up to 120° C., preferably to 60° to 85° C. After completion of the reaction, it is expedient to remove the solvent at 0° to 40° C. in vacuum and to add the complex compound obtained directly to the nitrating acid. For the nitration it is essential that the temperature lie between −10° and 30° C., preferably not being higher than 15° C. The 1-formyl-3-nitro-azacycloalkan-2-one usually precipitates after the addition of ice water in the form of colorless crystals, which are separated.

The 1-formyl-3-nitro-azacycloalkan-2-ones are obtained according to the invention in very good yields. They are important intermediates in the production of amino acids, in particular of lysin, and of agricultural chemicals such as, for instance, the fungicides described in French Pat. No. 1,441,071.

Thus, for example, 3-nitro-azacycloheptan-2-one can be readily obtained by saponifying the formyl compound. Then it is heated in water to a temperature between 50° and 100° C., preferably to the boiling point. When the solution cools, the 3-nitro-azacycloheptan-2-one crystallizes in excellent yield. It can be hydrogenated in known manner, without further purification, to obtain 3-amino-azacycloheptan-2-one which is important for the production of lysin.

The following examples illustrate the invention. The temperatures are given in degrees centigrade and the melting points are uncorrected.

EXAMPLE 1 a. Seventy g of phosgene are conducted at 10° to 15° into 51.2 g of dimethylformamide and 30 ml of chloroform. The mixture is then treated dropwise at 10° to 20° with a solution of 33.9 g of cyclohexanone oxime in 120 ml of chloroform, kept for 12 hours at room temperature and then heated for 2 hours to 50° to 60°. The solvent is then removed by distilling in vacuum and the residue is added dropwise at 0° to 10° to a nitrating mixture obtained from 60 ml of concentrated nitric acid and 300 ml of concentrated sulfuric acid. After completion of the addition, the nitrating mixture is poured immediately into ice water precipitating the nitro compound. The precipitate is removed and washed neutral with water. The resulting 1-formyl-3-nitro-azacycloheptan-2-one, recrystallized from ethanol, has a melting point of 120°–122°. The yield is 28.5 g = 51.3 percent of theory.

b. Following the procedure described in Example 1(a), using 29.2 g of dimethylformamide, 61.4 g of phosphorus oxychloride, 22.6 g of cyclohexanone oxime and a nitrating mixture obtained from 40 ml of concentrated nitric acid and 200 ml of concentrated sulfuric acid, there are obtained 13.1 g (35 percent of theory) of 1-formyl-3-nitro-azacycloheptan-2-one, m.p. 120°–122°.

c. Following the procedure described in Example 1(a), using 29.2 g of dimethylformamide, 84 g of phosphorus pentachloride, 22.6 g of cyclohexanone oxime and a nitrating mixture obtained from 40 ml of concentrated nitric acid and 200 ml of concentrated sulfuric acid, there are obtained 22.25 g (61 percent of theory) of 1-formyl-3-nitro-azacycloheptan-2-one, m.p. 120°–122°.

d. If the 33.9 g of cyclohexanone oxime in Example 1(a) are replaced by 58 g of cyclododecanone oxime, there is obtained in an analogous manner, in a crude yield of 81 percent of theory, 1-formyl-3-nitro-azacyclotridecan-b 2-one, having a melting point of 112°–119°.

EXAMPLE 2

Seventy g of phosgene are conducted at 5°–10° into 51.2 g of dimethylformamide and 300 ml of chloroform. After stirring for 1 hour at the same temperature, a solution of 38.2 g of cycloheptanone oxime in 120 ml of chloroform is added dropwise at 10°–20° to the mixture. The mixture is then stirred for 12 hours at room temperature and then heated for 2 hours to 50°–60. The solvent is then removed by distilling in vacuum, and the oily residue is added dropwise into a nitrating mixture obtained from 60 ml of concentrated nitric acid and 300 ml of concentrated sulfuric acid. After completion of the addition, the nitrating mixture is slowly dropped into ice/water. The crystal slurry is separated, washed with water and recrystallized from methanol. The 1-formyl-3-nitro-azacyclooctan-2-one has a melting point of 104°–107°.

What we claim is:

1. A process for the production of 1-formyl-3-nitroazacycloalkan-2-one compounds of the formula:

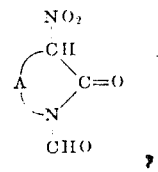

Wherein A represents alkylene of from four to ten carbon atoms in its chain, which is unsubstituted or substituted by at least one lower alkyl, comprising the steps of (1) reacting, at a temperature of from 0° to 120° C., in an aprotic solvent, (a) a cycloalkanone oxime of the formula:

with (b) a formamide of a secondary amine of the formula:

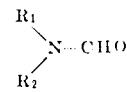

wherein $R_1$ represents alkyl of from one to five carbon atoms and $R_2$ represents alkyl of from one to five carbon atoms, phenyl or benzyl, or $R_1$ and $R_2$ taken together with their adjacent nitrogen atom represents morpholino or piperidino, and (c) a halogenating agent selected from the group consisting of phosphorus oxychloride, phosphorus trichloride, phosphorus pentachloride, phosphorus tribromide, thionyl chloride, sulfuryl chloride and phosgene, to obtain an intermediate complex, (2) nitrating said intermediate complex with concentrated nitric acid at a temperature of from 10° to 30° C., and (3) hydrolyzing the nitrated complex by the addition of ice water.

2. A process according to claim 1, in which the formamide is dimethyl formamide.

3. Process according to claim 1, in which the nitration is performed with a mixed acid consisting of nitric acid and sulfuric acid.

* * * * *